United States Patent
Ringström et al.

(10) Patent No.: US 8,891,676 B2
(45) Date of Patent: Nov. 18, 2014

(54) ANTENNA DEVICE AND METHOD IN A MIMO SYSTEM

(75) Inventors: Markus Ringström, Stockholm (SE); Bo Göransson, Sollentuna (SE); Fredrik Ovesjö, Älvsjö (SE); Henrik Asplund, Stockholm (SE)

(73) Assignee: Optis Cellular Technology, LLC, Plano, TX (US)

( * ) Notice: Subject to any disclaimer, the term of this patent is extended or adjusted under 35 U.S.C. 154(b) by 0 days.

(21) Appl. No.: 13/824,746

(22) PCT Filed: Sep. 23, 2010

(86) PCT No.: PCT/SE2010/051024
§ 371 (c)(1),
(2), (4) Date: Mar. 18, 2013

(87) PCT Pub. No.: WO2012/039659
PCT Pub. Date: Mar. 29, 2012

(65) Prior Publication Data
US 2013/0182794 A1  Jul. 18, 2013

(51) Int. Cl.
| H04K 1/02 | (2006.01) |
| H04L 25/03 | (2006.01) |
| H04L 25/49 | (2006.01) |
| H04B 7/04 | (2006.01) |
| H04B 7/06 | (2006.01) |

(52) U.S. Cl.
CPC ............ *H04B 7/0456* (2013.01); *H04B 7/0469* (2013.01); *H04B 7/0434* (2013.01); *H04B 7/0617* (2013.01)
USPC .............................. 375/297; 375/295; 375/296

(58) Field of Classification Search
CPC ... H04B 7/0434; H04B 7/0617; H04B 7/0456
USPC ....................................................... 375/297
See application file for complete search history.

(56) References Cited

U.S. PATENT DOCUMENTS

| 2007/0223423 A1 | 9/2007 | Kim et al. |
| 2009/0181708 A1 | 7/2009 | Kim et al. |
| 2012/0140801 A1 | 6/2012 | Asplund et al. |

FOREIGN PATENT DOCUMENTS

| WO | WO 2008/022243 A2 | 2/2008 |
| WO | WO 2011/019310 A1 | 2/2011 |

OTHER PUBLICATIONS

International Search Report, Application No. PCT/SE2010/051024, May 20, 2011.

(Continued)

*Primary Examiner* — Erin File
(74) *Attorney, Agent, or Firm* — Vincent J. Allen; James H. Ortega; Carstens & Cahoon, LLP (57) ABSTRACT

The invention relates to the technical field of radio communications, and in particular to an antenna device for a radio base station, and a method of operating an antenna device in a Multiple-Input Multiple-Output system. Embodiments of the invention disclose a secondary precoder (24) in series with a Multiple-Input Multiple-Output precoder (22). The Multiple-Input Multiple-Output precoder (22) has a first plurality of inputs (26, 28) for one or more Multiple-Input Multiple-Output data streams, and a first plurality of outputs (30, 32) for the one or more Multiple-Input Multiple-Output data streams. The secondary precoder has a second plurality of inputs (34, 36) and a second plurality of outputs (38, 40). The first plurality of outputs (30, 32) are in communication with the second plurality of inputs (34, 36). The antenna device further comprises a controller device (64), and the antenna device is operable to control an output power value of the one or more data streams at the second plurality of outputs (38, 40).

19 Claims, 6 Drawing Sheets

(56) References Cited

OTHER PUBLICATIONS

Written Opinion of the International Searching Authority, Application No. PCT/SE2010/051024, May 20, 2011.
Ericsson et al: "HSDPA MIMO codebook subset restriction", 3gpp Draft; R1-094977 HSDPA MIMO Codebook Subset Restriction, 3rd Generation Partnership Project (3gpp), Mobile Competence Centre; 650, Route Des Lucioles, F-06921 Sophia-Antipolis Cedex, France, No. Jeju; 20091109, Nov. 9, 2009, XP050389331.
Qualcomm Europe, MIMO Codebook restrictions for single stream transmissions, 3GPP Draft; R1-0958068 MIMO Codebook Restrictions, 3rd Generation Partnership Project (3GPP), Mobile Competence Centre; 650, Rout Des Lucioles; F-06921 Sophia-Antipolis Cedex; France Nov. 9, 2009.
Supplementary European Search Report, Application No. EP10857591.1 dated Feb. 27, 2014.

|  | Transport Block Size | Number of HS-PDSCH codes | Precoder weight | Modulation | Power |
|---|---|---|---|---|---|
| User 1 | | | | | |
|   MIMO Stream 1 | - | - | - | - | - |
|   MIMO Stream 2 | - | - | - | - | - |
| User 2 | | | | | |
|   MIMO Stream 1 | - | - | - | - | - |
|   MIMO Stream 2 | - | - | - | - | - |
| ... | - | - | - | - | - |
| User n | | | | | |
|   MIMO Stream 1 | - | - | - | - | - |
|   MIMO Stream 2 | - | - | - | - | - |

ANTENNA DEVICE AND METHOD IN A MIMO SYSTEM

CROSS REFERENCE TO RELATED APPLICATION

This application is a 35 U.S.C. §371 national stage application of PCT International Application No. PCT/SE2010/051024, filed on 23 Sep. 2010, the disclosure and content of which is incorporated by reference herein in its entirety. The above-referenced PCT International Application was published in the English language as International Publication No. WO 2012/039659 A1 on 29 Mar. 2012.

TECHNICAL FIELD

The invention relates to the technical field of radio communications, and in particular to an antenna device for a radio base station, and a method of operating an antenna device in a Multiple-Input Multiple-Output (MIMO) system.

BACKGROUND

The evolution of radio interface standards has been strongly focused on increased data rates, and in the Third Generation Partnership Project (3GPP) Release 7 a technology known as Multiple Input Multiple Output (MIMO) was introduced. Such technology uses multiple antennas at both the transmitter and receiver to theoretically double the downlink data rate using multiple data stream transmission.

Certain User Equipment (UE) categories are able to use MIMO technology, but other legacy UE categories are not be able to use MIMO technology. A network must be able to support both MIMO enabled and non-MIMO enabled UEs. Support for legacy UEs may be provided by transmitting all system vital information and traffic channels on a single antenna. However, if there are separate Power Amplifiers (PA) for the multiple antennas, which is typically the case, the utilization of the PAs is suboptimal. This is because one antenna may be transmitting and receiving much more data than another antenna which represents an under utilisation of resources. In effect there is no power sharing between the PAs.

The problem of uneven power sharing may be alleviated by using Butler matrices at a Base Transceiver Station (BTS), also known as the NodeB. Such Butler matrices distribute the load equally over the PAs, but have the drawback of requiring more hardware and introducing a power loss. Furthermore, Butler matrices are not always useable for power balancing if the data streams from the transmit antennas are correlated, which is the case for example with single stream MIMO.

Another solution is to transmit all channels not using MIMO from the antennas through the use of Space-Time Transmit Diversity (STTD) encoding, which is an open loop transmit diversity scheme standardized in 3GPP Release 99. Such STTD encoding is supported by most UEs on the market. However, even though STTD transmission alleviates the PA power balancing problem and may be beneficial for common channels, there is less benefit for dedicated channels and in particular the High-Speed Downlink Shared Channel (HS-DSCH). The use of STTD encoding may actually harm the performance in certain cases, especially on the HS-DSCH which is a shared channel and a scheduled resource.

Further problems are also encountered with dual-stream MIMO transmission when providing mobile communication systems that support both MIMO enabled and non-MIMO enabled UEs. Typically it is assumed that the two data streams transmitted from each MIMO antenna have the same power, particularly in the case of Channel Quality Indicator (CQI) reporting when each UE calculates the quality of each data stream. In practice this may not always happen due to restrictions at a scheduler device within the BTS which is a controller device that allocates radio resources and when data for a plurality of UEs is to be transmitted. In general, to support both MIMO enabled and non-MIMO enabled UEs a MIMO precoder may be used in series with a secondary precoder, with each precoder imparting respective matrices on the data stream. At a data stream level the power allocation input to the MIMO precoder may be uneven, and the two precoders then distribute this power over the two PAs. In some instances a power imbalance may then be seen between the PAs, which is undesirable because it is a suboptimal use of resources.

In another scenario, if $P_{tot}$ is the total power available at two PAs, and $P_{tot}/2$ is allocated to one data stream at one PA, and if a second data stream is formed by the scheduler device when a transmit buffer of the BTS only contains a small amount of data, the transmit power of the second data stream at the second PA may be less than $P_{tot}/2$. Such a scenario also provides an imbalance of power between the data streams from the PAs which is undesirable.

Other situations may also lead to the PAs allocating different power to the two data streams for dual stream MIMO operation. In one scenario this may be caused by power calculation rounding errors when calculating the number of bits for an available transport format. In another scenario this may be caused when one of the MIMO data streams is required to be retransmitted if Hybrid Automatic Repeat Request (HARQ) is used. When using HARQ, if a radio channel has deteriorated since an original transmission, one data stream may need to be transmitted using more power than used for the initial transmission. If $P_{tot}/2$ was used for the initial transmission of one data stream this will mean that the retransmitted stream will have a power of more than $P_{tot}/2$, and the other stream will be transmitted with less than $P_{tot}/2$, which is undesirable for the above reasons.

SUMMARY

It is desirable to provide a way of operating radio communications hardware more efficiently, and to reduce at least some of the above-mentioned power balancing problems.

According to a first aspect of the invention, there is provided an antenna device for a radio base station. The device comprising a Multiple-Input Multiple-Output precoder and a secondary precoder arranged in series therewith. The multiple-input multiple-output precoder having a first plurality of inputs for one or more Multiple-Input Multiple-Output data streams, and a first plurality of outputs for the one or more Multiple-Input Multiple-Output data streams. The secondary precoder having a second plurality of inputs and a second plurality of outputs. The first plurality of outputs being in communication with the second plurality of inputs. Wherein the antenna device further comprises a controller device and the antenna device is operable to control an output power value of the one or more data streams at the second plurality of outputs.

Such an antenna device provides the advantage of being able to control the power between Power Amplifiers (PAs) associated with a respective antenna when it is appropriate. Such power control is achieved by the use of the controller device in combination with the Multiple-Input Multiple-Output precoder and the secondary precoder which operates to control the signal power at the second plurality of outputs.

The power control is achieved without the power loss associated with Butler matrices of the prior art.

In one embodiment the controller device is operable to control an input power value of the one or more data streams input to the one or more of the first plurality of inputs to control the output power value of the one or more data streams at the second plurality of outputs. Such an arrangement is a convenient way to control the power at the second plurality of outputs when dual stream MIMO signals are being transmitted.

In another embodiment the antenna device includes a respective amplifier device in communication with each second plurality of outputs, the controller device being operable so that the output power value of one of the data streams from the amplifier devices is less than or equal to $P_{tot}/2$, where $P_{tot}$ is the total available output power of the amplifier devices. Such an arrangement permits the controller device to be involved with controlling the power of the one or more data streams output from the antenna device.

Preferably the Multiple-Input Multiple-Output precoder is operable with a set of weights $w_1, w_2, w_3, w_4$ according to the Third Generation Partnership Project Technical Standard 25.214. In one embodiment the antenna device is operable to exclude selected weights of the set of weights to control at least one output power value of the one or more data streams at the second plurality of outputs. Excluding said weights is a convenient way to control the power at the second plurality of outputs.

The Multiple-Input Multiple-Output precoder may be operable such that if the output power value of one data stream is different to the output power value of another data stream at the second plurality of outputs the $w_2$ weights $(1-j)/2$ and $(-1+j)/2$ are excluded.

In one embodiment the antenna device includes a respective amplifier device in communication with each second plurality of outputs, the controller device being operable such that if the output power value of one of the data streams from the amplifier devices exceeds $P_{tot}/2$ said $w_2$ weights $(1-j)/2$ and $(-1+j)/2$ are excluded, where $P_{tot}$ is the total available output power of the amplifier devices. Such an arrangement may allow a combination of the controller device and the Multiple-Input Multiple-Output precoder to control the power at the second plurality of outputs.

In another embodiment the Multiple-Input Multiple-Output precoder is operable to exclude the $w_2$ weights $(1-j)/2$ and $(-1+j)/2$ if more than one user device is scheduled in a transmission time interval of the antenna device. Such an arrangement may further reduce an imbalance of power at the second plurality of outputs.

In one embodiment the antenna device includes a respective amplifier device in communication with each second plurality of outputs, the controller device being operable to permit the output power value of one of the data streams from the amplifier device to exceed $P_{tot}/2$ when the Multiple-Input Multiple-Output precoder is operated with the $w_2$ weights $(1+j)/2$ and $(-1-j)/2$, where $P_{tot}$ is the total available output power of the amplifier devices. The controller device may be operable to permit the output power value of one of the data streams from the amplifier devices to exceed $P_{tot}/2$ up to a predefined threshold value. Preferably the predefined threshold value is given by $(P_{tot}/2)k$, where k is $1 < k \leq 1.2$. Such an arrangement may help to avoid further problems with power imbalance, for example, when HARQ is used.

In one embodiment the antenna device includes a respective amplifier device in communication with each second plurality of outputs, and a user device in communication with the antenna device which is configured to report a preferred weight to the antenna device, wherein if the difference in output power value of the data streams from the amplifier devices is within a predefined threshold value the preferred weight is used to operate the Multiple-Input Multiple-Output precoder. Such an arrangement may have the advantage of improving a Block Error Rate (BLER) for receipt of user data by the user device.

In one embodiment the Multiple-Input Multiple-Output precoder is operable with the $w_2$ weights $(1-j)/2$ and $(-1+j)/2$, and the antenna device is operable such that $|P1 - P2|/(P1 + P2) < x$, where x is a predefined threshold value, and where P1 and P2 are the input power values of the input data streams.

According to a second aspect of the invention there is provided a transmitter including an antenna device according to the first aspect of the invention.

According to a third aspect of the invention there is provided a method of operating an antenna device in a Multiple-Input Multiple-Output system. The Multiple-Input Multiple-Output system having a Multiple-Input Multiple-Output precoder and a secondary precoder arranged in series therewith. The Multiple-Input Multiple-Output precoder having a first plurality of inputs for one or more Multiple-Input Multiple-Output data streams. The Multiple-Input Multiple-Output precoder having a first plurality of outputs for the one or more Multiple-Input Multiple-Output data streams. The secondary precoder having a second plurality of inputs and a second plurality of outputs. The first plurality of outputs being in communication with the second plurality of inputs. The second plurality of outputs being in communication with respective antennas. The method including operating the antenna device using a controller device to control an output power value of the one or more data streams at the second plurality of outputs.

Such a method provides the advantage of being able to control the power between PAs associated with a respective antenna when it is appropriate. Such power control is achieved by using the controller device in combination with the Multiple-Input Multiple-Output precoder and the secondary precoder which is operable to control the signal power at the second plurality of outputs. The power control is achieved without the power loss associated with Butler matrices of the prior art.

In one embodiment the method further includes controlling an input power value of the one or more data streams input to the one or more first plurality of inputs to control the output power value of the one or more data streams at the second plurality of outputs. Such an arrangement is a convenient way to control the power at the second plurality of outputs when dual stream MIMO signals are being transmitted.

In another embodiment each second plurality of outputs is in communication with a respective amplifier device, the method including operating the controller device so that the output power value of one of the data streams from the amplifier devices is less than or equal to $P_{tot}/2$, where the total available output power of the amplifier devices is given by $P_{tot}$. Such an arrangement permits the controller device to be involved with controlling the power of the one or more data streams output from the antenna device.

Preferably the method further includes operating the Multiple-Input Multiple-Output precoder with a set of weights $w_1, w_2, w_3, w_4$ according to the Third Generation Partnership Project Technical Standard 25.214. In one embodiment the method further includes operating the antenna device to exclude selected weights of the set of weights to control at least one output power value of the one or more data streams at the second plurality of outputs. Excluding said weights is a convenient way to control the power at the second plurality of outputs.

The method may include determining whether the output power values of the data streams at the second plurality of outputs are different and operating the Multiple-Input Multiple-Output precoder to exclude the $w_2$ weights $(1-j)/2$ and $(-1+j)/2$.

In one embodiment each second plurality of outputs is in communication with a respective amplifier device, the method including determining if the output power value of one of the data streams at the amplifier devices exceeds $P_{tot}/2$, where $P_{tot}$ is the total available output power of the amplifier devices, and operating the controller device to exclude said $w_2$ weights $(1-j)/2$ and $(-1+j)/2$. Such an arrangement may allow a combination of the controller device and the Multiple-Input Multiple-Output precoder to control the power at the second plurality of outputs.

In another embodiment the method includes determining if more than one user device is scheduled in a transmission time interval of the antenna device, and operating the Multiple-Input Multiple-Output precoder to exclude the $w_2$ weights $(1-j)/2$ and $(-1+j)/2$. Such an arrangement may further reduce an imbalance of power at the second plurality of outputs.

In one embodiment each second plurality of outputs is in communication with a respective amplifier device, the method including operating the Multiple-Input Multiple-Output precoder using the $w_2$ weights $(1+j)/2$ and $(-1-j)/2$, and operating the controller device to permit the output power value of one of the data streams from the amplifier devices to exceed $P_{tot}/2$, where $P_{tot}$ is the total available output power of the amplifier devices. The method may further include operating the controller device to permit the output power value of one of the data streams from the amplifier devices to exceed $P_{tot}/2$ up to a predefined threshold value. Preferably the method includes using the predefined threshold value given by $(P_{tot}/2)k$, where k is $1 < k \le 1.2$. Such an arrangement may help to avoid further problems with power imbalance, for example, when HARQ is used.

In one embodiment each second plurality of outputs is in communication with a respective amplifier device, and a user device is provided in communication with the antenna device to report a preferred weight to the antenna device, the method including operating the Multiple-Input Multiple-Output precoder using the preferred weight if the difference in output power values of the data streams from the amplifier devices is within the predefined threshold value. Such an arrangement may have the advantage of improving a Block Error Rate (BLER) for receipt of user data by the user device.

In one embodiment the method further includes operating the Multiple-Input Multiple-Output precoder using the $w_2$ weights $(1-j)/2$ and $(-1+j)/2$, and operating the antenna device such that $|P1 - P2|/(P1 + P2) < x$, where x is a predefined threshold value, and where P1 and P2 are the input power values of the input data streams.

According to a fourth aspect of the invention there is provided a communications network including an antenna device according to the first aspect of the invention, or including a transmitter according to the second aspect of the invention, or using a method according to the third aspect of the invention.

According to a fifth aspect of the invention there is provided a radio base station including an antenna device according to the first aspect of the invention, or using a method according to the third aspect of the invention.

According to a sixth aspect of the invention there is provided a computer program product operable to control the antenna device according to the first aspect of the invention, or the transmitter of the second aspect of the invention, or the radio base station according to the fifth aspect of the invention, or to perform a method according to the third aspect of the invention.

According to an alternative characterisation of the invention there is provided an antenna device for a radio base station. The device comprising a common precoder having a first plurality of inputs and a first plurality of outputs. The first plurality of inputs for receiving a respective data stream. Each first plurality of inputs being in communication with each first plurality of outputs. The antenna device further comprises a controller device. The antenna device being operable to control an output power value of the one or more data streams at the first plurality of outputs.

Preferably the common precoder is arranged in series with a Multiple-Input Multiple-Output precoder which has a second plurality of inputs for one or more Multiple-Input Multiple-Output data streams, and a second plurality of outputs for one or more data streams, the second plurality of outputs in communication with the first plurality of inputs.

Optional features of the first and third characterisations of the invention may be used with the alternative characterisations of the invention respectively.

BRIEF DESCRIPTION OF THE DRAWINGS

Other features of the invention will be apparent from the following description of preferred embodiments shown by way of example only with reference to the accompanying drawings, in which.

DETAILED DESCRIPTION

Figure 1:
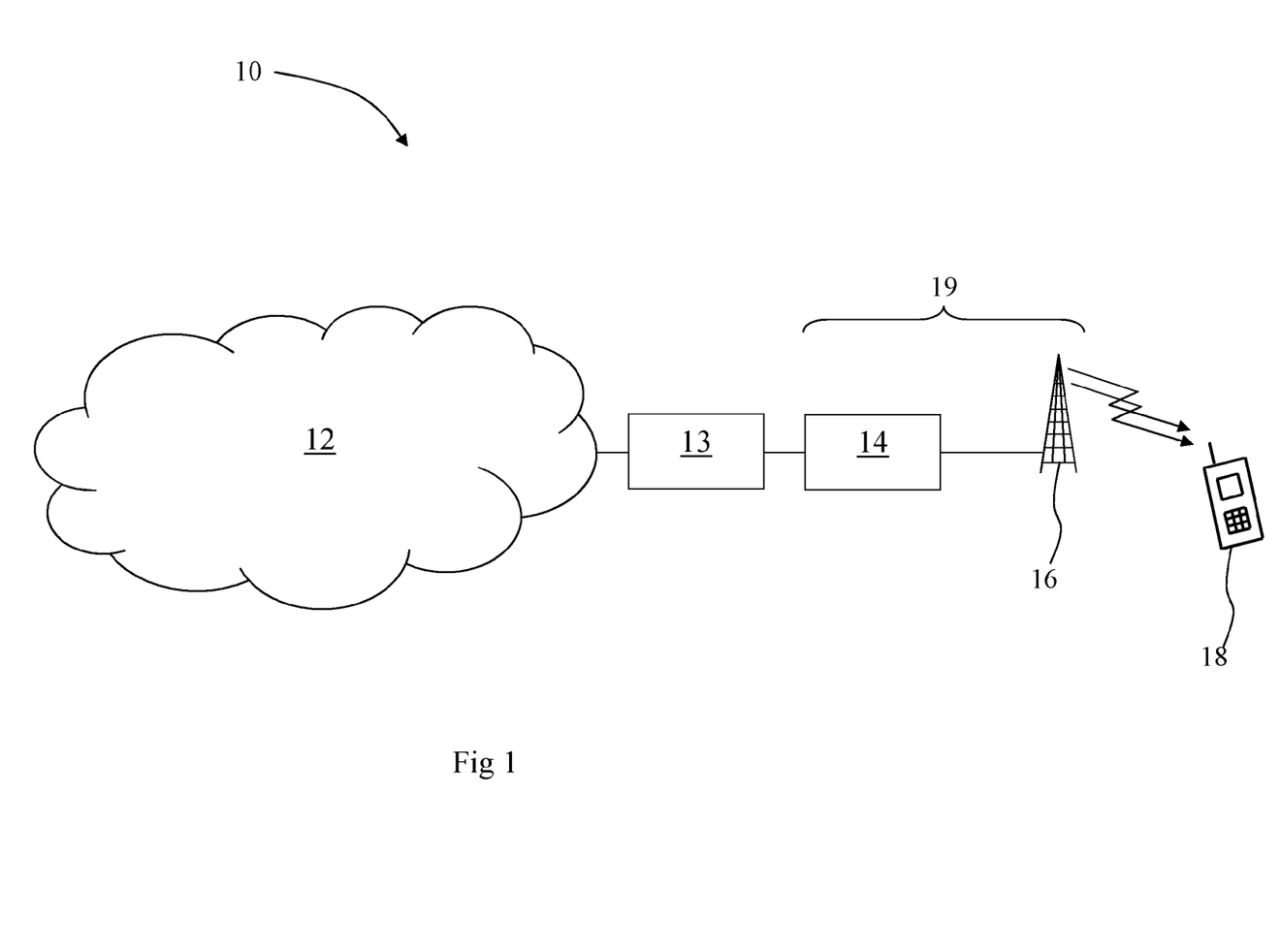
FIG. 1 shows a diagram of a mobile communications network for describing embodiments of the invention.

FIG. 1 shows a diagram of a mobile communications network for describing embodiments of the invention, generally designated 10. The mobile communications network 10 comprises a core network 12 in communication with a Radio Network Controller 13 (RNC). The RNC 13 is in communication with a Base Transceiver Station (BTS) 14, alternatively known as a NodeB, or a radio base station. The BTS 14 has an antenna arrangement 16 for communication with one or more user devices 18. Together the BTS 14, the antenna arrangement 16, and the one or more user devices 18 form a Multiple-Input Multiple-Output (MIMO) system 19.

Figure 2:
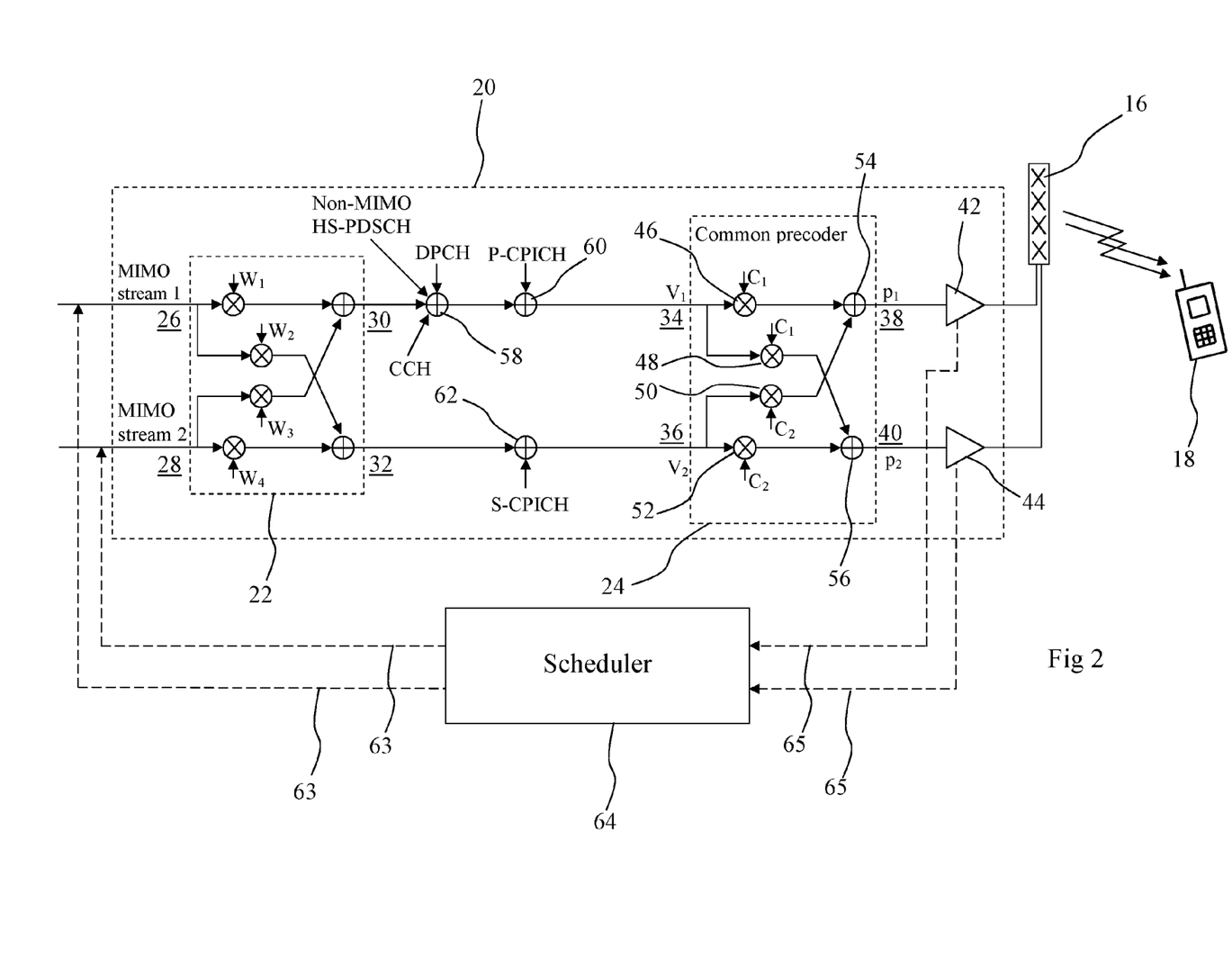
FIG. 2 is a schematic diagram of an antenna device according to an embodiment of the invention.

FIG. 2 is a schematic diagram of an antenna device according to an embodiment of the invention, generally designated 20. Like features to the arrangements of FIG. 1 are shown with like reference numerals. In FIG. 2 the antenna device 20 is a device located inside the BTS 14 of FIG. 1. FIG. 2 shows the antenna device 20 to comprise a MIMO precoder 22 in communication with a secondary precoder 24, also known as a common precoder. The MIMO precoder 22 has a first input 26 and a second input 28 for receiving MIMO data streams 1 and 2 respectively. The inputs 26, 28 are in communication with a first output 30 and a second output 32 of the MIMO precoder 22. The MIMO precoder 22 is a known item according to the Third Generation Partnership Project Technical Standard 25.214 and will not be described further other than to mention that it is operable with a known set of precoding weights $w_1, w_2, w_3, w_4$. The precoding weights $w_1$ and $w_3$ are constant real valued scalars, and the precoding weights $w_2$ and $w_4$ are variable complex valued scalars. The weights $w_1$, $w_2, w_3, w_4$ are given by:

$$w_3 = w_1 = 1/\sqrt{2}$$

$$w_4 = -w_2$$

$$w_2 \in \left\{ \frac{1+j}{2}, \frac{1-j}{2}, \frac{-1+j}{2}, \frac{-1-j}{2} \right\}$$

The secondary precoder 24 has a first input port 34, a second input port 36, a first output port 38, and a second output port 40. The input ports 34, 36 may be known as virtual antenna ports $v_1, v_2$, and the output ports 38, 40 may be known as physical antenna ports $p_1, p_2$. Each output port 38, 40 is in communication with a respective Power Amplifier (PA) 42, 44, also known as amplifier devices, which are in turn in communication with a respective antenna of the antenna arrangement 16. It will be appreciated that the antenna arrangement 16 shown comprises a MIMO composite antenna with slant +45°/−45° dual-polarised antennas according to known arrangements. Such slant +45°/−45° dual-polarized antennas are the most common site installation utilized. The first output port 30 of the MIMO precoder 22 is in communication with the first input port 34 of the secondary precoder 24. The second output port 32 of the MIMO precoder 22 is in communication with the second input port 36 of the secondary precoder 24.

A signal input to the first input port 34 is split and input to two respective multiplier devices 46, 48. Similarly, a signal input to the second input port 36 is split and input to two respective multiplier devices 50, 52. The splitting of the signals is arranged so that an equal power signal is input to the multiplier devices 46, 48, and to the multiplier devices 50, 52. The multiplier devices 46, 48, 50, 52 operate to transform, or precode, the signals input thereto by multiplying them with a value according to the precoder matrix defined by P:

$$P = \begin{pmatrix} c_{11} & c_{21} \\ c_{12} & c_{22} \end{pmatrix} = \frac{1}{\sqrt{2}} \begin{pmatrix} 1 & e^{j\pi/4} \\ j & e^{-j\pi/4} \end{pmatrix} \quad (1)$$

The value $c_{11}$ is applied at the multiplier 46, the value $c_{12}$ is applied at the multiplier 48, the value $c_{21}$ is applied at the multiplier 50, and the value $c_{22}$ is applied at the multiplier 52. The output of the multiplier 46 and the output of the multiplier 50 are combined at a combiner 54. The output of the multiplier 48 and the output of the multiplier 52 are combined at a combiner 56. The combiners 54, 56 operate to add signals input thereto and pass the respective combined signals to the outputs 38, 40. Accordingly, the operation of the secondary precoder 24 can be given by the following equation:

$$\begin{pmatrix} p_1 \\ p_2 \end{pmatrix} = \frac{1}{\sqrt{2}} \begin{pmatrix} 1 & e^{j\pi/4} \\ j & e^{-j\pi/4} \end{pmatrix} \begin{pmatrix} v_1 \\ v_2 \end{pmatrix} \quad (2)$$

The precoder matrix P imparts an orthogonal polarization and a phase shift between the signals output from the antenna arrangement 16. Since the power of data signals input to the multipliers 46, 48 and the multipliers 50, 52 is the same, the signals output from the outputs 38, 40 of the secondary precoder 24 have an equal power in certain situations as mentioned below for single stream transmission. This means that full power balancing can be achieved for the PAs 42, 44 for these situations. Whereas the precoder matrix is defined by P, it will be appreciated that other precoder matrices may be used to provide signals at the antenna arrangement 16 that are not orthogonal, but that are substantially orthogonal, or slightly away from orthogonal. The matrix P is just one example of a matrix providing orthogonal signals, and other matrices may also result in orthogonal signals.

In the embodiment shown the secondary precoder 24 is implemented at baseband, which is prior to up-conversion of the data signals to Radio Frequency. Implementing the secondary precoder 24 at baseband is a convenient way for performing the transformation, but it will be appreciated that the precoder 24 could alternatively be implemented at different parts of the network 10, or the BTS 14, such as in the digital parts of the BTS 14 or in the analogue parts of the BTS 14.

Also shown in FIG. 2 are first and second data stream combiners 58, 60 which are arranged in series between the first output port 30 of the MIMO precoder 22 and the first input port 34 of the secondary precoder 24. A third data stream combiner 62 is also shown between the second output port 32 of the MIMO precoder 22 and the second input port 36 of the secondary precoder 24. The first data stream combiner 58 is shown to be able to receive data sent over a non-MIMO High-Speed Physical Downlink Shared Channel (HS-PDSCH), a Dedicated Physical Channel (DPCH), or a Common Channel (CCH). The second data stream combiner 60 is shown to be able to receive data sent over a first Common Pilot Channel (P-CPICH). The third data stream combiner 62 is shown to be able to receive data sent over a second Common Pilot Channel (S-CPICH). It will be appreciated that in FIG. 2 the data sent over non-MIMO HS-PDSCH, DPCH, CCH, P-CPICH, or S-CPICH is shown to be physically input after the MIMO precoder 22 and before the secondary precoder 24. It will also be appreciated that these different signals would be generated at the same time in parallel and then summed together using the antenna device 20.

Whereas the secondary precoder 24 may provide power balancing at the PAs 42, 44 for dual stream MIMO signals in certain situations, such power balancing is not guaranteed if the input data streams are correlated, which is the case for single stream MIMO signals. In this context one signal is correlated with another signal if the signals are identical but at different phase. This potential problem is avoided by inputting the single stream MIMO signal over the HS-PDSCH at one of the first plurality of inputs 26, 28, excluding the $w_2$ weights $(1-j)/2$ and $(-1+j)/2$ at the MIMO precoder 22 and inputting a non-MIMO signal over the HS-PDSCH at the first data stream combiner 58. This arrangement provides a polarization of the signals at the antenna arrangement 16 with substantially equal amplitudes for the horizontal and vertical polarisation components of its electric field vector. This arrangement means that at the user device 18, which may be a legacy non MIMO device, the polarisation varies over time due to reflections.

The precoder matrix P provides good performance for single stream MIMO signals, as well as for Single-Input Single Output (SISO) signals and Single-Input Multiple-Output (SIMO) signals. Using the precoder matrix P, power balancing at the PAs 42, 44 is achieved for SISO and single stream MIMO. Using the precoder matrix P, the dual stream MIMO signals are transmitted from the antenna arrangement 16 on orthogonal polarizations, which are vertically and horizontally polarized. This is an advantageous arrangement because such vertically and horizontally polarized signals are statistically optimal for transmission, and have less interstream interference when compared to other pairs of orthogonal polarizations. Thus, it is desirable to ensure that one set of the MIMO precoder weights $w_1, w_2, w_3, w_4$ in combination with the precoder matrix P results in vertical and horizontal polarizations for the MIMO signals transmitted from the antenna arrangement 16. With the most commonly installed phase-calibrated slant +45°/−45° base station antennas, the required combined effective weights of the MIMO precoder 22 and the secondary precoder 24 are [1 1] and [1 −1] which may be applied with a complex scaling factor, as per the precoder matrix P. It will be appreciated that if the antenna arrangement 16 is equipped with vertically and horizontally polarized antennas a precoder matrix [1 1; 1 −1] can be used at the secondary precoder 24 to obtain the same properties as the precoder matrix P when using phase-calibrated slant +45°/−45° base station antennas.

It will be appreciated that when transmitting SISO signals from the antenna arrangement 16, the precoder matrix P results in an advatageous polarization received at the user device 18 because legacy mobile devices 18 may not be able to handle signals that are transmitted on non-varying polarizations such as polarizations solely consisting of a vertical or a horizontal polarization. In general the vertical and horizontal polarizations are largely unaffected by the channel, whereas other polarizations will be transformed by the channel to polarizations that vary over time. Such a polarization that varies over time may include elliptic polarization, circular polarization or +45°/−45° polarizations. It will be appreciated by the skilled person that the most suitable polarizations are those that contain equal power on both orthogonal projections. It will also be appreciated that the circular polarizations are the only polarisations that can fully utilize both PAs 42, 44 while maintaining equal power on the vertical and horizontal components.

The antennas of the antenna array 16 may be calibrated or non-calibrated. In the case where the antennas are calibrated the resulting polarization by applying the precoder matrix P will be vertical and horizontal polarizations for MIMO signals, and circular polarization for SISO signals. In the case where the antennas are not calibrated the polarization of the MIMO signals by applying the precoder matrix P will be random and orthogonal, and the polarization of the SISO signal will be elliptic with the extreme cases being circular polarization, and horizontal and vertical polarizations.

The two signals at the outputs 38, 40 are transmitted from a pair of antennas in the antenna arrangement 16 that are orthogonally polarized with respect to each other. Operation of a MIMO precoder 22, or a combination of the MIMO precoder 22 and secondary precoder 24 maps a certain information stream onto both outputs 38, 40. When power balancing at the PAs 42, 44 is achieved, the signal streams present at the outputs 38, 40 have equal magnitude and may have a phase shift. When the two data stream present at the outputs 38, 40 are radiated from respective antennas at the antennas arrangement 16, the radiated electromagnetic waves will be a superposition of the waves from each antenna. The polarization of these waves will be a function of both the respective antenna polarizations, and also of the phase shift between the data streams present at the outputs 38, 40. For example, if the antenna polarizations at the antenna arrangement 16 are +45° slant linear and −45° slant linear, and the phase shift is 0°, the resulting polarization will be vertical. If the phase shift is 90° instead of 0°, an electromagnetic field vector will rotate as a function of time, resulting in circular polarization.

Also shown in FIG. 2 is a scheduler device 64, also known as a controller device, which is in communication with each input 26, 28 and each of the power amplifiers 42, 44 shown with dashed arrows. The scheduler device 64 is in communication with the first and second input ports 26, 28 via connections 63, and with each PA 42, 44 via connections 65. The scheduler device 64 is a controller device that operates in parallel to the antenna device 20 to allocate when data for a plurality of user devices 18 is to be transmitted.

Figure 3:
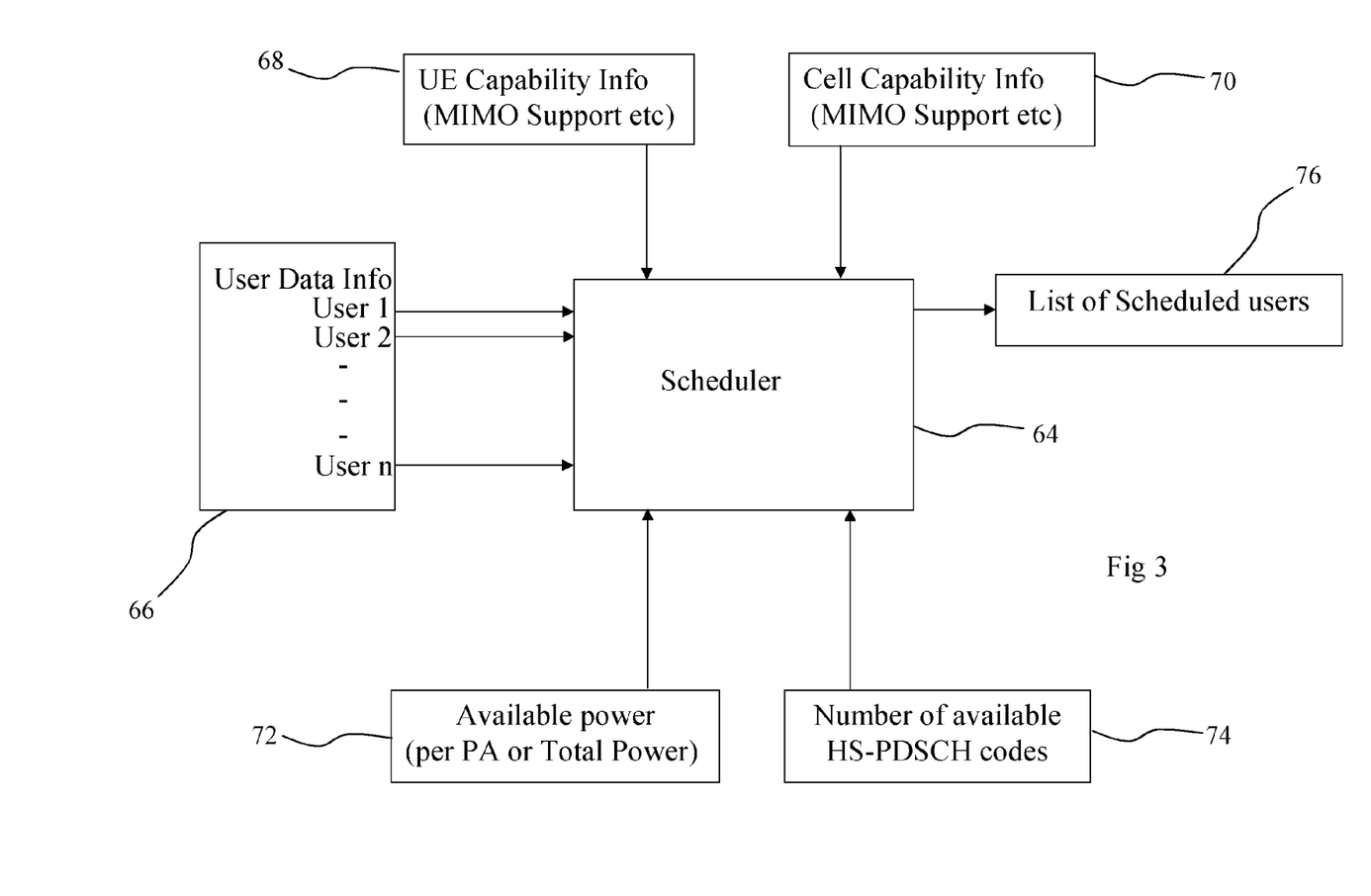
FIG. 3 shows a schematic diagram of a scheduler device shown in FIG. 2.

FIG. 3 shows a schematic diagram of the scheduler device 64 shown in FIG. 2. In FIG. 3 like features to the arrangements of FIG. 2 are shown with like reference numerals. In FIG. 3 the scheduler device 64 receives user data information to be transmitted to a plurality of user devices 18 shown as users 1, 2, . . . n at 66. The scheduler device 64 also receives user device capability information from the user device 18 as shown at 68, and cell capability information as shown at 70. This capability information 68, 70 may include whether a particular user device 18, or cell supports MIMO technology or not, or what data format is supported. The scheduler device 64 also receives information about the available power at the PAs 42, 44 which may be information about the total power available for both PAs 42, 44 combined, or for each PA 42, 44 individually, as shown at 72. Such information about the power available is received via the connection 65 in FIG. 2. In FIG. 3 the scheduler device 64 also receives information about the data transmission format, such as the number of HS-PDSCH codes that are available for transmission as shown at 74.

Figure 4:
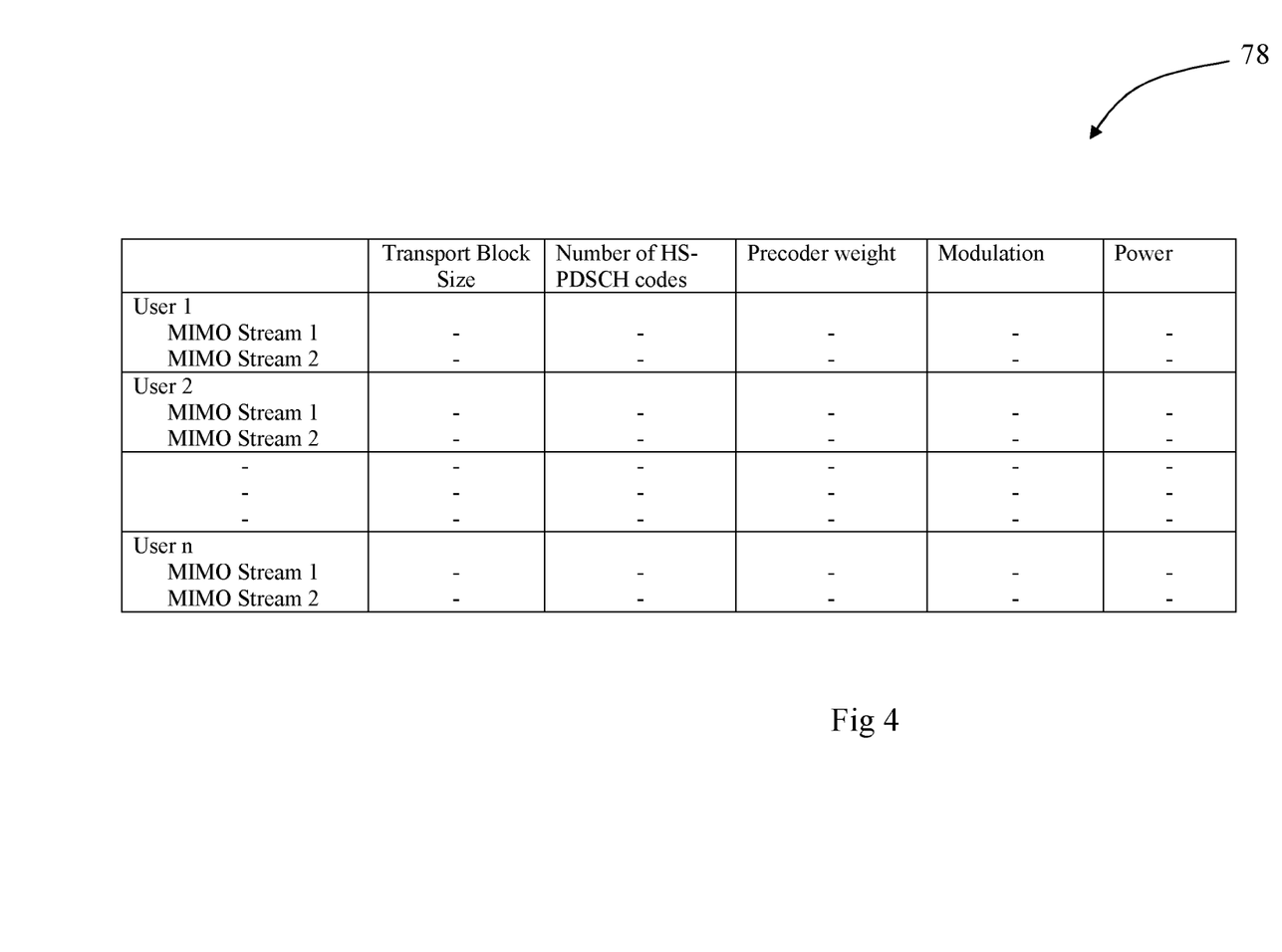
FIG. 4 shows a table of a list of scheduled users.

The scheduler device 64 outputs a list of scheduled users as shown at 76 in the form of information shown in a Table 78 shown in FIG. 4. The information in table 78 comprises parameters about the MIMO data streams 1 and 2 input at the first input 26 and the second input 28 for each user device 18 indicated as user 1, 2, . . . n in the table 78. The parameters include a Transport Block Size (TBS), a number of HS-PDSCH codes, a precoder weight for each MIMO data stream, and a modulation to be used for the first and second MIMO streams input at the first input 26 and the second input 28. Such parameters are communicated for use at the first input 26 and the second input 28 via the connections 63. The parameters are used to configure a data processor (not shown) in layer 1 in the BTS 14. The parameters in the table 78 also include a power level which is used to set the power of the MIMO data streams 1 and 2 received at the inputs 26, 28. It will be appreciated that these power levels influence the power levels of the data streams from the PAs 42, 44. Such a scheduler device 64 is particularly useful for controlling the power output of data streams from the PAs 42, 44 when dual stream MIMO signals are being transmitted. The scheduler device 64 receives information about the total power available at the PAs 42, 44 via the connections 65, and is operable to control the power level of the MIMO data streams 1 and 2 at the inputs 26, 28 in relation to the total power available at the PAs 42, 44. In one arrangement the scheduler device 64 controls the power level of the MIMO data streams 1 and 2 at the inputs 26, 28 in such a way that the total power available at the PAs 42, 44 is not exceeded.

When the two data streams from each PA 42, 44 have different powers the load on the PAs 42, 44 varies depending on the precoder matrix used at the MIMO precoder 22. With dual stream MIMO transmission when the $w_2$ weights $(1+j)/2$ and $(-1-j)/2$ are used at the MIMO precoder 22 the power of the data streams from the PAs 42, 44 is substantially the same. When the $w_2$ weights $(1-j)/2$ and $(-1+j)/2$ are used the power of the MIMO component of the total signal of the data streams from the PAs 42, 44 is the same as the input power distribution at the inputs 26, 28, which may be undesirable. For example, if the MIMO stream 1 at the first input 26 is allocated 3 dB more power than the MIMO stream 2 at the second input 28, the power of the MIMO component of the data stream from one PA 42, 44 will be 3 dB higher than the power of the data stream form the other PA 42, 44. In an embodiment of the invention this is avoided by choosing the weights used by the MIMO precoder 22 based on a combination of a Pre-Coder Indication (PCI) reported by the user device 18 and on what power the scheduler device 64 allocate to the two MIMO data streams input the first and second input ports 26, 28 as described below. It will be appreciated that such a PCI is a weight preferred by the user device 18 for achieving an improved reception of the user data information at the user device 18.

Choosing a different weight for the MIMO precoder 22 to the preferred weight reported by the user device 18 may increase the Block Error Rate (BLER) because a Channel Quality Indication (CQI) reported by the user device 18 is based on applying the preferred weight. If the power difference between the data streams from the PAs 42, 44 is small enough, for example if one of the data streams has a power of up to 20% more than $P_{tot}/2$ where $P_{tot}$ is the total available power of the two PAs 42, 44, it may be more advantageous to use the preferred weight reported by the user device 18 for operating the MIMO precoder 22 than choosing a different weight that would provide a more balanced power between the data streams from the PAs 42, 44. In such an arrangement there is some power imbalance between the data streams from the PAs 42, 44 but the BLER would be reduced. The antenna device 20 may be operable to permit the output power value of one of the data streams from the PAs 42, 44 to exceed $P_{tot}/2$ up to a predefined threshold value.

It is generally more complicated for the scheduler device 64 to keep track of the power level at the PAs 42, 44 because it depends on the PCI from the user device 18, the power of the MIMO data streams, and the power required for multiple user devices 18. Accordingly, in another embodiment the power difference of the MIMO data streams 1 and 2 at the inputs 26, 28 may have an imbalance corresponding to an imbalance of up to 20% at the PAs 42, 44 before a different weight is selected to the PCI reported by the user device 18.

It will be appreciated that in general the restriction to use only certain weights for operating the MIMO precoder 22 is required to be applied only when there is a power imbalance between the data streams from the PAs 42, 44. In one embodiment the restriction to use certain weights for operating the MIMO precoder 22 is applied only when one of the data streams from the PAs 42, 44 is allocated more than $P_{tot}/2$.

In another embodiment neither data stream from the PAs 42, 44 are allocated more than $P_{tot}/2$ by the scheduler device 64. This may however decrease performance in certain situations, for example, when one of the data streams from the PAs 42, 44 is required to be retransmitted using more than $P_{tot}/2$ if Hybrid Automatic Repeat Request (HARQ) is used. In this scenario, since there is a problem only when the $w_2$ weights $(1-j)/2$ and $(-1+j)/2$ are used, the power of one data stream from the PAs 42, 44 may be larger than $P_{tot}/2$ if the MIMO precoder 22 is operated with the $w_2$ weights $(1+j)/2$ and $(-1-j)/2$, and limited to $P_{tot}/2$ if the $w_2$ weights $(1-j)/2$ and $(-1+j)/2$ are used. It is envisaged that there would be other situations where the scheduler device 64 would allocate more power to one of the MIMO data streams 1 and 2 input at the inputs 26, 28 so that the power of one of the data streams from the PAs 42, 44 is more than $P_{tot}/2$. As previously mentioned, since some power imbalance is acceptable without causing severe problems, the restriction may be relaxed slightly such that the $w_2$ weights $(1-j)/2$ and $(-1+j)/2$ are used if the power of one data stream output from the PAs 42, 44 does not exceed a predefined threshold value given by $(P_{tot}/2)k$, where k is a real number. In one embodiment k is between 1 and 1.2.

In another embodiment, the MIMO precoder 22 is operable with the $w_2$ weights $(1-j)/2$ and $(-1+j)/2$, and the antenna device 20 is operable such that $|P1-P2|/(P1+P2)<x$, where P1 and P2 are the input power values of the first and second MIMO data streams at the first and second inputs 26, 28, and where x is a maximum relative power difference which is a predefined threshold value. If $|P1-P2|/(P1+P2)>x$ only the $w_2$ weights $(1+j)/2$ and $(-1-j)/2$ are used.

The antenna device 20 may be operated to transmit data to more than one High-Speed (HS) user device 18 in the same Transmission Time Interval (TTI). Having a different power of the data streams from the PAs 42, 44, which may include MIMO and non-MIMO signals, is not a problem in itself unless the total capability of either of the PAs 42, 44 is exceeded. For example, if one data stream from the PAs 42, 44 has a power of $P_{tot}/2$ and the other data stream uses less than $P_{tot}/2$, then if no additional user device is scheduled in the same TTI to use the remaining power the load on the PAs 42, 44 will still be acceptable for any $w_2$ weight used to operate the MIMO precoder 22. However, if the remaining power is used for transmitting data to another HS user device 18 in the same TTI then an imbalance may cause overload on one of the PAs 42, 44. Hence, the embodiments described above for power sharing of the data streams may be combined with a check to determine if the remaining power after allocation by the scheduler device 64 is to be used for transmitting data to other user devices 18. In one embodiment, the restriction to use only the $w_2$ weights $(1+j)/2$ and $(-1-j)/2$ is only enforced if data for transmission to additional HS user devices 18 is scheduled in the same TTI, whereas any of the $w_2$ weights can be used if no data for transmission to additional HS user devices 18 is scheduled in the same TTI.

In another embodiment the restriction of the maximum power that can be applied to the two data streams from the PAs 42, 44 is performed in a different way as shown in the following example. Let a particular matrix used to operate the secondary precoder 24 have the following properties:

If the $w_2$ weights $(1+j)/2$ and $(-1-j)/2$ are used to operate the MIMO precoder 22, then the power of the MIMO stream 1 input to the first input 26 will be equally divided between the two PAs 42, 44, and the power of the MIMO stream 2 input to the second input 28 will be equally divided between the two PAs 42, 44;

If the $w_2$ weight $(1-j)/2$ is used to operate the MIMO precoder 22, then the power of the MIMO stream 1 input to the first input 26 passes entirely to the first PA 42, and the power of the MIMO stream 2 input to the second input 28 passes entirely to the second PA 44; and If the $w_2$ weight $(-1+j)/2$ is used to operate the MIMO precoder 22, then the power of the MIMO stream 1 input to the first input 26 passes entirely to the second PA 44, and the power of the MIMO stream 2 input to the second input 28 passes entirely to the first PA 42.

In the example of the preceding paragraph, if the antenna device 20 is operated so that the $w_2$ weights $(1+j)/2$ and $(-1-j)/2$ are applied at the MIMO precoder 22, then the scheduler device 64 can assume that the total available power at the two PAs 42, 44 is the total power available for the MIMO data streams 1 and 2. If the antenna device 20 is operated so that the $w_2$ weight $(1-j)/2$ is applied at the MIMO precoder 22, then the scheduler device 64 can assume that the MIMO data stream 1 input to the first input 26 is able to use the available power at the first PA 42, and the MIMO data stream 2 is able to use the total available power at the second PA 44. If the antenna device 20 is operated so that the $w_2$ weight $(-1+j)/2$ is applied at the MIMO precoder 22, then the scheduler device 64 can assume that the total power available for the MIMO data stream 1 input to the first input 26 is able to use the total available power at the second PA 44, and the total power available for the MIMO data stream 2 input to the second input 28 is able to use the total power at the first PA 42.

In another alternative embodiment the power of all data streams is adjusted after precoding has taken place such as after the first and second output ports 38, 40. With this arrangement the data stream from the output ports 38, 40 is adjusted so that neither of the PAs 42, 44 outputs more than $P_{tot}/2$.

In the above described embodiments where some imbalance between the power level of the data streams from the PAs 42, 44 is tolerated, it will be appreciated that such an imbalance may be measured at the PAs 42, 44 or at points within the antenna device 20 prior to the PAs 42, 44 such as at the inputs 26, 28, 34, 36 or the outputs 30, 32, 38, 40.

Figure 5A:
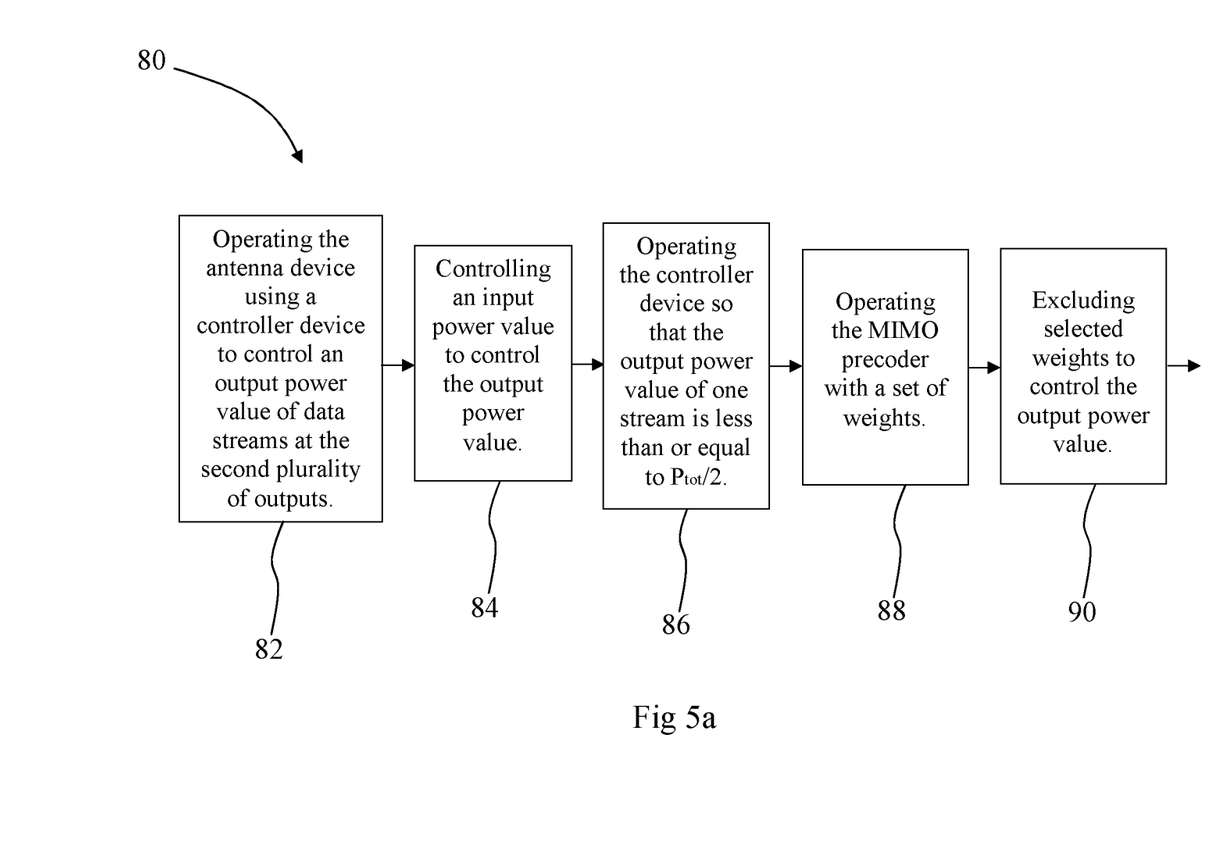
FIG. 5 shows a flow diagram illustrating a method according to an embodiment of the invention.
Figure 5B:
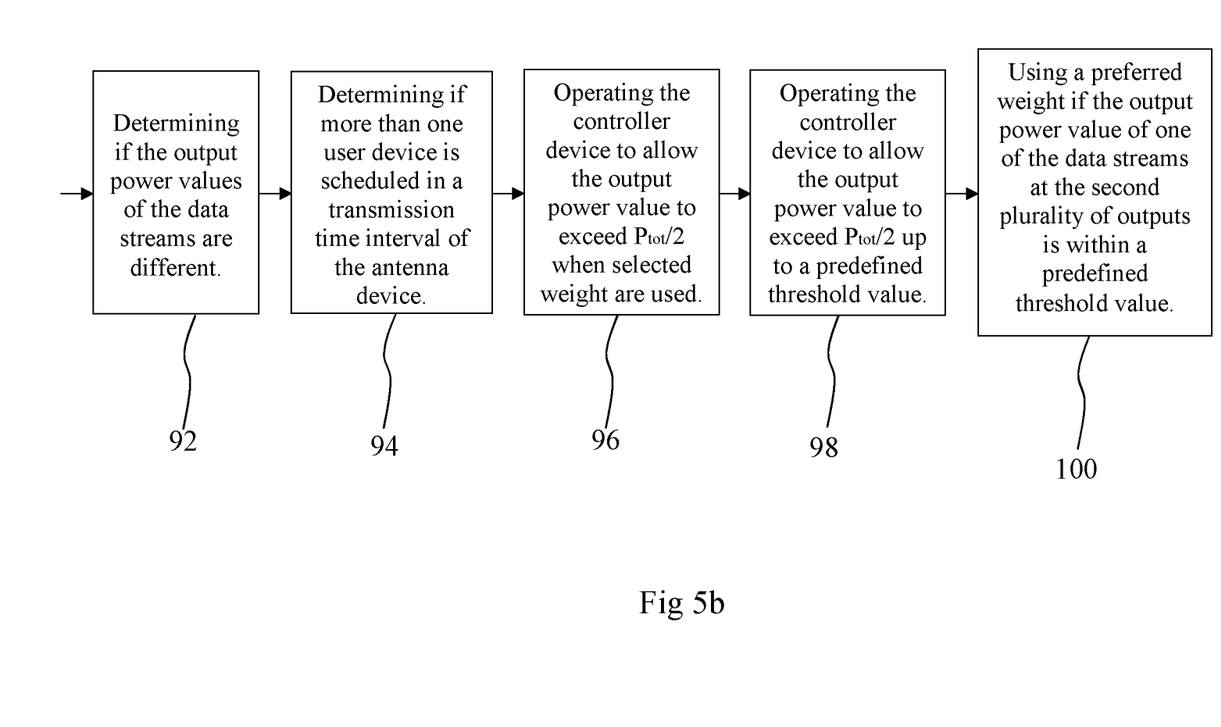

FIG. 5 comprises FIGS. 5a and 5b, and shows a flow diagram illustrating a method according to an embodiment of the invention, generally designated 80. The method 80 relates to the operation of the antenna device 20 in a multiple-input multiple-output (MIMO) system with reference to FIGS. 2-4. The MIMO system has a multiple-input multiple-output precoder 22 and a secondary precoder 24 arranged in series therewith, the multiple-input multiple-output precoder 22 having a first plurality of inputs 26, 28 for one or more multiple-input multiple-output data streams, and a first plurality of outputs 30, 32 for the one or more Multiple-Input Multiple-Output data streams, the secondary precoder having a second plurality of inputs 34, 36 and a second plurality of outputs 38, 40, the first plurality of outputs 30, 32 being in communication with the second plurality of inputs 34, 36, and the second plurality of outputs 38, 40 being in communication with respective antennas 16. The method includes operating the antenna device 20 using a controller device 64 to control an output power value of the one or more data streams at the second plurality of outputs 38, 40, as shown at 82.

The method includes controlling an input power value of the one or more data streams input to the one or more first plurality of inputs 26, 28 to control the output power value of the one or more data streams at the second plurality of outputs 38, 40, as shown at 84. In one embodiment, when each second plurality of outputs 38, 40 is in communication with a respective amplifier device 42, 44, the method includes operating the controller device 64 so that the output power value of one of the data streams from the amplifier devices 42, 44 is less than or equal to $P_{tot}/2$, as shown at 86, where the total available output power of the amplifier devices 42, 44 is given by $P_{tot}$.

The method includes operating the multiple-input multiple-output precoder 22 with a set of weights $w_1, w_2, w_3, w_4$ according to the Third Generation Partnership Project Technical Standard 25.214, as shown at 88. The method includes operating the antenna device 20 to exclude selected weights of the set of weights to control at least one output power value of the one or more data streams at the second plurality of outputs 38, 40, as shown at 90.

The method further includes determining whether the output power values of the data streams at the second plurality of outputs 38, 40 are different, as shown at 92. The method includes operating the multiple-input multiple-output precoder 22 to exclude the $w_2$ weights $(1-j)/2$ and $(-1+j)/2$, as shown at 90. When each second plurality of outputs 38, 40 is in communication with a respective amplifier device 42, 44, the method includes determining if the output power value of one of the data streams at the amplifier devices 42, 44 exceeds $P_{tot}/2$, where $P_{tot}$ is the total available output power of the amplifier devices 42, 44 as shown at 92. The method includes operating the antenna device to exclude said $w_2$ weights $(1-j)/2$ and $(-1+j)/2$, as shown at 90.

The method includes determining if more than one user device is scheduled in a transmission time interval of the antenna device, as shown at 94. The method includes operating the multiple-input multiple-output precoder 22 to exclude the $w_2$ weights $(1-j)/2$ and $(-1+j)/2$, as shown at 90.

When each second plurality of outputs 38, 40 is in communication with a respective amplifier device 42, 44, the method includes operating the multiple-input multiple-output precoder 22 using the $w_2$ weights $(1+j)/2$ and $(-1-j)/2$, as shown at 90. In one embodiment the method includes operating the controller device 64 to permit the output power value of one of the data streams from the amplifier devices 42, 44 to exceed $P_{tot}/2$, as shown at 96, where $P_{tot}$ is the total available output power of the amplifier devices 42, 44. The method includes operating the controller device 64 to permit the output power value of one of the data streams from the amplifier devices 42, 44 to exceed $P_{tot}/2$ up to a predefined threshold value, as shown at 98. The method includes using the predefined threshold value given by $(P_{tot}/2)k$, where k is $1 < k \leq 1.2$, as shown at 98.

When each second plurality of outputs 38, 40 is in communication with a respective amplifier device 42, 44, and a user device 18 is provided in communication with the antenna device 20 to report a preferred weight to the antenna device 20, the method includes operating the multiple-input multiple-output precoder 22 using the preferred weight if the difference in output power values of the data streams from the amplifier devices 42, 44 is within the predefined threshold value, as shown at 100.

The method includes operating the multiple-input multiple-output precoder 22 using the $w_2$ weights $(1-j)/2$ and $(-1+j)/2$, as shown at 90. The method including operating the antenna device such that $|P1 - P2|/(P1 + P2) < x$, where x is a predefined threshold value, and where P1 and P2 are the input power values of the input data streams, as shown at 98.

It will be appreciated that the embodiments described above allow three different modes of operation which are non MIMO operation, single stream MIMO operation, and dual stream MIMO operation. With non MIMO operation, which is applicable to legacy user devices, the data to be communicated follows the path from the first data stream combiner 58, to the secondary precoder 24, and then to the antenna arrangement 16. The user device 18 estimates the channel conditions using the P-CPICH signal and feeds this information back to the antenna device 20. The effect of the secondary precoder 24 and the exclusion of the $w_2$ weights $(1-j)/2$ and $(-1+j)/2$ at the MIMO precoder 22 will result in equal utilization of the PAs 42, 44. For power balancing at the PAs 42, 44, the weights $c_{11}$ and $c_{12}$ need to have the same magnitude, although the phase can be different. However, if $c_{11}$ and $c_{12}$ are of equal magnitude and the secondary precoder 16 provides an orthogonal transformation at the antennas 16, it is impossible to simultaneously achieve power balancing at the PAs 42, 44 for all possible weights $w_1, w_2, w_3, w_4$ that may be applied at the MIMO precoder 22. It has been shown above that it is possible to achieve power balancing at the PAs 42, 44 for two of the four available $w_2$ weights at the MIMO precoder 22 if the weights applied at the secondary precoder 22 are selected in a certain manner according to the precoder matrix P. The non MIMO signals are transmitted from the antenna arrangement 16 with a polarization having equal magnitude for its projection on the horizontal polarization, as its projection on the vertical polarization. If the antennas of the antenna arrangement 16 are slant +45/−45 linearly polarized, and power balancing at the PAs 42, 44 is to be achieved, the polarization of the non MIMO signals can only be either right-hand circular or left-hand circular. As previously mentioned, the benefit of such an arrangement is that the polarization of the radiated waves when they arrive at the user device 18 will be continuously varying due to the uncorrelated fading of the vertical and the horizontal components in the wireless radio channel. In this case, the necessary phase shift between the signals at the outputs 38, 40 is +90 degrees or −90 degrees, which can be expressed in MATLAB notations as:

$$c12=c11*\exp(\pm i*pi/2).$$

With single stream MIMO operation, applicable to MIMO enabled user devices, the data to be communicated follows the path from the first input 26 via the MIMO precoder 22, to the secondary precoder 24, and then to the antenna arrangement 16. The weights to be applied at the MIMO precoder 22 are user-specific, and are selected from the set of available weights by means of feedback from the user device 18 of the preferred set of weights. The user device 18 determines a preferred set of MIMO precoder weights by utilizing separately estimated channel conditions from the two virtual antennas $v_1$, $v_2$, which in turn is obtained using the P-CPICH and the S-CPICH signals respectively. From the channel conditions, the user device 18 then calculates which of the MIMO precoder weights give the best communication channel. The MIMO precoder weights $w_3$ and $w_4$ are not applied with single stream MIMO operation, so the user simply reports which of the four possible values for $w_2$ that it prefers. For single stream MIMO operation, the effect of the MIMO precoder 22 and the secondary precoder 24 will result in equal utilization of the PAs 42, 44. Furthermore, the two MIMO streams transmitted from the antenna arrangement 16 will be vertical polarization and horizontal polarization respectively. The advantage of this arrangement is that there is little cross-scattering between these two polarizations in the wireless radio channel and hence the inter-stream interference will be smaller. Thus, the receiver at the user device 18 can more easily restore the orthogonality between the two MIMO streams leading to better performance and higher data throughput.

With dual stream MIMO operation, applicable to MIMO enabled user devices, two separate streams of information input to the first and second inputs 26, 28 are utilised for a higher data throughput. In other respects, dual steam MIMO operation is similar to single stream MIMO operation, whereby the user device 18 reports the preferred $w_2$ value. It will be appreciated that dual stream MIMO operation is possible as long as the first and the second streams are orthogonal to each other, and since the MIMO precoder 22 and secondary precoder 24 are operated with orthogonal matrices, the two streams will be orthogonal from the antenna arrangement 16. For dual stream MIMO operation, the effect of the MIMO precoder 22 and the secondary precoder 24 will result in equal utilization of the PAs 42, 44 provided that the power at the first plurality of inputs 26, 28 is equal. For optimal dual stream MIMO operation, the secondary precoder 24 needs to provide an orthogonal transformation, i.e. the orthogonal input signals on the first and second input ports 34, 36 need to be mapped to orthogonal linear combinations on the output ports 38, 40. This is necessary to preserve the separation between the first and the second MIMO streams, and also to retain the power balancing properties of the dual stream MIMO signals. The condition of orthogonality can be expressed in MATLAB notations as:

$$[c11 c12]*\mathrm{conj}([c21;c22])=c11*\mathrm{conj}(c21)+c12*\mathrm{conj}(c22)=0.$$

The two MIMO streams are transmitted from the antenna arrangement 16 on vertical polarization and horizontal polarization respectively. The advantage of this arrangement is that there is little cross-scattering between these two polarizations in the wireless radio channel and hence the inter-stream interference will be smaller. Thus, the receiver at the user device 18 can more easily restore the orthogonality between the two MIMO streams leading to better performance and higher throughput.

The BTS 14 may be simultaneously configured to operate more than one mode of operation depending on the capabilities of the different user devices in a mobile cell which it is serving. For example legacy devices, single stream devices, and dual stream devices may be present in the cell at the same time. A MIMO enabled user device 18 will report whether it prefers single stream MIMO or dual stream MIMO operation, and this can change rapidly due to changing channel conditions.

It can be seen that the embodiments of the invention described above provide substantially equal utilization of the two PAs 42, 44 for all three modes of operation. This is a useful feature because the relative amount of user devices 18 operating the three different modes may change over time. For example, at times there may only be user devices 18 operating one mode of operation. The secondary precoder 24 on its own cannot fully achieve power balancing at the PAs 42, 44 on its own for all three modes of operation, but if the utilization of weights applied at the MIMO precoder 22 is restricted to the two $w_2$ weights for which power balancing is obtained, then power balancing at the PAs 42, 44 is achieved for all three modes of operation. This restriction may be applied either at the user device 18, which feeds back the preferred MIMO precoder weights, or at the BTS 14 which selects the actual MIMO precoder weights to use based on the feedback from the user device 18.

It will be appreciated that in some of the above embodiments the resulting uneven power allocated to the data streams from the PAs 42, 44 can be handled by a more complex scheduler device 64. For example, when the scheduler device 64 calculates the second data stream, if the scheduler device 64 finds out that there is no valid transport block corresponding to the power used for the first stream it can use this information and calculate a new transport block for the first stream again. The scheduler device 64 can be programmed to iterate this process until valid transport blocks with equal power are found for each data stream from the PAs 42, 44. This arrangement provides for a more complex scheduler device 64 which may not be desirable. One advantage of certain embodiments of the invention described above is that power balancing can be maintained without increasing the complexity of the scheduler device 64.

It will be appreciated that other MIMO codebooks may be used where the weights $w_1$, $w_2$, $w_3$, $w_4$ have different values to provide a different output from the MIMO precoder 22. Such a different codebook may solve power balancing issues at the PAs 42, 44. However, it is likely that the different codebook may result in sub-optimal polarization states for the MIMO signals transmitted from the antenna arrangement 16.

In this scenario, it is envisaged that the secondary precoder 24 may be used to optimize the polarization states for the MIMO signals transmitted from the antenna arrangement 16 to provide a substantially orthogonal polarization of the signals from the antennas 16. Accordingly, the secondary precoder 24 may be used to solve the power balancing problem at the PAs 42, 44, and to resolve any sub-optimal polarizations for signals transmitted from the antenna arrangement 16.

It will also be appreciated that in certain embodiments of the invention described above using the secondary precoder 24 has the advantage that power balancing is achieved at the PAs 42, 44. By applying the particular precoder matrix P described above, optimum performance is achieved for both MIMO and SISO signals. By excluding certain MIMO precoding weights, power balancing at the PAs 42, 44 is achieved for single stream and dual stream MIMO. Whereas the MIMO procoder 22 uses weights that are variable per user device 18 according to the 3GPP Standard 25.214, it will be appreciated that the secondary precoder 24 is operable with a fixed precoder matrix defined by P above.

The above embodiments describe operation of the antenna device 20 using the HSPDA protocol, but it will be appreciated that other protocols may be used.

The invention claimed is:

1. An antenna device for a radio base station, the device comprising:
   a Multiple-Input Multiple-Output precoder;
   a secondary precoder arranged in series therewith,
      the Multiple-Input Multiple-Output precoder having a first plurality of inputs for one or more Multiple-Input Multiple-Output data streams, and a first plurality of outputs for the one or more Multiple-Input Multiple-Output data streams,
      the secondary precoder having a second plurality of inputs and a second plurality of outputs, the first plurality of outputs being in communication with the second plurality of inputs; and
   a controller device, wherein the antenna device is configured to control an output power value of the one or more data streams at the second plurality of outputs of the secondary precoder.

2. An antenna device according to claim 1, wherein the controller device is configured to control an input power value of the one or more data streams input to the one or more of the first plurality of inputs of the Multiple-Input Multiple-Output precoder to control the output power value of the one or more data streams at the second plurality of outputs of the secondary precoder.

3. An antenna device according to claim 1, wherein the Multiple-Input Multiple-Output precoder operates responsive to a set of weights $w_1, w_2, w_3, w_4$ according to the Third Generation Partnership Project Technical Standard 25.214.

4. An antenna device according to claim 3, wherein the antenna device is configured to exclude selected weights of the set of weights to control at least one output power value of the one or more data streams at the second plurality of outputs of the secondary precoder.

5. An antenna device according to claim 4, wherein the Multiple-Input Multiple-Output precoder is configured such that when the output power value of one data stream is different from the output power value of another data stream at the second plurality of outputs the $w_2$ weights $(1-j)/2$ and $(-1+j)/2$ are excluded.

6. An antenna device according to claim 5, further comprising a plurality of amplifier devices each in communication with a different one of the second plurality of outputs, wherein the controller device is configured such that when the output power value of one of the data streams from the amplifier devices exceeds $P_{tot}/2$ said $w_2$ weights $(1-j)/2$ and $(-1+j)/2$ are excluded, where $P_{tot}$ is the total available output power of the amplifier devices.

7. An antenna device according to claim 3, further comprising a plurality of amplifier devices each in communication with a different one of the second plurality of outputs, wherein the controller device is configured to permit the output power value of one of the data streams from the amplifier device to exceed $P_{tot}/2$ when the Multiple-Input Multiple-Output precoder is operated with the $w_2$ weights $(1+j)/2$ and $(-1-j)/2$, where $P_{tot}$ is the total available output power of the amplifier devices.

8. An antenna device according to claim 7, wherein the controller device is configured to permit the output power value of one of the data streams from the amplifier devices to exceed $P_{tot}/2$ up to a predefined threshold value.

9. An antenna device according to claim 3, wherein:
   the controller device is configured to control an input power value of the one or more data streams input to the one or more of the first plurality of inputs of the Multiple-Input Multiple-Output precoder to control the output power value of the one or more data streams at the second plurality of outputs of the secondary precoder; and
   the Multiple-Input Multiple-Output precoder is configured with the $w_2$ weights $(1-j)/2$ and $(-1+j)/2$, and the antenna device is configured such that $|P1 - P2|/(P1 + P2) < x$, where x is a predefined threshold value, and where P1 and P2 are the input power values of the input data streams.

10. An antenna device according to claim 1, further comprising a plurality of amplifier devices each in communication with a different one of the second plurality of outputs, wherein the controller device is configured so that the output power value of one of the data streams from the amplifier devices is less than or equal to $P_{tot}/2$, where $P_{tot}$ is the total available output power of the amplifier devices.

11. A method of operating an antenna device in a Multiple-Input Multiple-Output system comprising:
   a Multiple-Input Multiple-Output precoder; and
   a secondary precoder arranged in series therewith,
   the Multiple-Input Multiple-Output precoder having:
      a first plurality of inputs for one or more Multiple-Input Multiple Output data streams, and
      a first plurality of outputs for the one or more Multiple-Input Multiple-Output data streams,
   the secondary precoder having a second plurality of inputs and a second plurality of outputs,
   wherein the first plurality of outputs are in communication with the second plurality of inputs, and the second plurality of outputs are in communication with respective antennas,
   the method comprising:
   operating the antenna device using a controller device to control an input power value of the one or more data streams input to the one or more first plurality of inputs; and
   further using the controller device to control an output power value of the one or more data streams at the second plurality of outputs of the secondary precoder based on the control of the input power value.

12. A method according to claim 11, further comprising operating the Multiple-Input Multiple-Output precoder responsive to a set of weights $w_1, w_2, w_3, w_4$ according to the Third Generation Partnership Project Technical Standard 25.214.

13. A method according to claim 12, further comprising operating the antenna device to exclude selected weights of the set of weights to control at least one output power value of the one or more data streams at the second plurality of outputs of the secondary precoder.

14. A method according to claim 13, further comprising:
operating the Multiple-Input Multiple-Output precoder to exclude the $w_2$ weights $(1-j)/2$ and $(-1+j)/2$ in response to determining that the output power values of the data streams at the second plurality of outputs of the secondary precoder are different.

15. A method according to claim 14, wherein each second plurality of outputs of the secondary precoder is in communication with a different one of a plurality of amplifier devices, the method comprising:
Operating the controller device to exclude said $w_2$ weights $(1-j)/2$ and $(-1+j)/2$ in response to determining that the output power value of one of the data streams at the amplifier devices exceeds $P_{tot}/2$, where $P_{tot}$ is the total available output power of the amplifier devices.

16. A method according to claim 12, wherein each second plurality of outputs is in communication with a different one of a plurality of amplifier devices, the method comprising:
operating the Multiple-Input Multiple-Output precoder using the $w_2$ weights $(1+j)/2$ and $(-1-j)/2$; and
operating the controller device to permit the output power value of one of the data streams from the amplifier devices to exceed $P_{tot}/2$, where $P_{tot}$ is the total available output power of the amplifier devices.

17. A method according to claim 16, further comprising operating the controller device to permit the output power value of one of the data streams from the amplifier devices to exceed $P_{tot}/2$ up to a predefined threshold value.

18. A method according to claim 12, further comprising:
controlling an input power value of the one or more data streams input to the one or more first plurality of inputs of the Multiple-Input Multiple-Output precoder to control the output power value of the one or more data streams at the second plurality of outputs of the secondary precoder;
operating the Multiple-Input Multiple-Output precoder using the $w_2$ weights $(1-j)/2$ and $(-1+j)/2$; and
operating the antenna device such that $|P1 - P2|/(P1 + P2) < x$, where x is a predefined threshold value, and where P1 and P2 are the input power values of the input data streams.

19. A method according to claim 11, wherein each second plurality of outputs is in communication with a different one of a plurality of amplifier devices, the method comprising operating the controller device so that the output power value of one of the data streams from the amplifier devices is less than or equal to $P_{tot}/2$, where the total available output power of the amplifier devices is given by $P_{tot}$.

* * * * *